United States Patent [19]

Beni et al.

[11] Patent Number: 5,153,844
[45] Date of Patent: Oct. 6, 1992

[54] METHOD AND APPARATUS FOR MEASURING SURFACE FLATNESS

[75] Inventors: Joseph A. Beni, Florence, S.C.; Michael J. Merrill, New Castle, Del.; Arun Prakash, West Chester, Pa.; John Taylor, New Castle, Del.

[73] Assignee: E. I. Du Pont de Nemours and Company, Wilmington, Del.

[21] Appl. No.: 469,644

[22] Filed: Jan. 23, 1990

[51] Int. Cl.⁵ .................. G01N 19/08; G01B 11/30
[52] U.S. Cl. .................... 364/560; 364/550; 356/371; 356/237; 73/104
[58] Field of Search .......... 364/560, 554, 550, 551.01; 356/371, 375, 376, 445, 237; 358/106, 107; 73/104, 105

[56] References Cited

U.S. PATENT DOCUMENTS

| | | | |
|---|---|---|---|
| 3,439,988 | 4/1969 | Breske | 356/237 |
| 3,885,875 | 5/1975 | Rosenfeld et al. | 356/120 |
| 4,468,120 | 8/1984 | Tanimoto et al. | 356/237 |
| 4,627,733 | 12/1986 | Wada | 356/359 |
| 4,629,319 | 12/1986 | Clarke et al. | 356/237 |
| 4,790,660 | 12/1988 | Ito et al. | 356/376 |
| 4,805,124 | 2/1989 | Krufka | 364/560 |
| 4,853,777 | 8/1989 | Hupp | 358/107 |
| 4,859,062 | 8/1989 | Thurn et al. | 356/371 |

OTHER PUBLICATIONS

"Laser Guage Qualifies Class A Surfaces," published in Plastics World, Feb., 1988, on p. 92, discloses a surface analyzer available from Ashland Chemical Co., of Columbus Ohio.

Primary Examiner—Parshotam S. Lall
Assistant Examiner—Edward Pipala
Attorney, Agent, or Firm—John E. Griffiths

[57] ABSTRACT

This invention relates to a method and apparatus for determining the flatness or planarity of a surface and, specifically, to a method and apparatus for determining the flatness or planarity of a surface using a computerized optics technique.

28 Claims, 8 Drawing Sheets

METHOD AND APPARATUS FOR MEASURING SURFACE FLATNESS

BACKGROUND OF THE INVENTION

1. Field of the Invention

This invention relates to a method and apparatus for determining the flatness or planarity of a surface and, specifically, to a method and apparatus for determining the flatness or planarity of a surface using a computerized optics technique.

2. Description of Related Art

The flatness of industrial films (such as, Mylar® polyester films) is of critical importance to processes involved in film preparation for its eventual application. For example, a non-flat film will cause processing problems in the manufacture of floppy discs. The flatness or planarity of films for this application has been traditionally determined by a subjective, visual inspection of the product. As a result of its subjective nature, this process suffers from inaccuracy and inconsistency. It further lacks adequate sensitivity to differentiate among various levels of flatness.

Various attempts have been made to determine surface flatness or presence of imperfections in the surface of an object. For example, U.S. Pat. No. 4,629,319 discloses a method and apparatus for detection and quantification of defects such as dents, creases, low spots, flat spots, etc., in surfaces, such as automobile body panels, refrigerator panels, furniture panels, and aircraft panels. U.S. Pat. No. 4,627,733 discloses a device for optically measuring the flatness of a slider head surface of a magnetic tape recording apparatus. U.S. Pat. No. 4,468,120 discloses an apparatus for detecting the presence of a foreign substance adhering to a surface. In U.S. Pat. No. 3,885,875, an electroptical device (i.e., a laser beam) provides an output proportional to a surface profile. U.S. Pat. No. 3,439,988 discloses illuminating a surface with a pattern of lines and visually inspecting the reflected surface appearing on a target.

Additionally, on page 92 of the February, 1988 issue of Plastics World there is described a surface analyzer available from Ashland Chemical Co., of Columbus Ohio, which utilizes a dot laser beam path reflected from a surface onto a screen, with video camera recorded images of the waviness of the path being digitized and analyzed by a minicomputer. Further, U.S. Pat. No. 4,853,777 assigned to Ashland Chemical Co. recently issued describing a surface analyzer which may be the analyzer described in the February, 1988 issue of Plastics World.

It is an object of this invention to provide a method and apparatus for determining the flatness or planarity of a surface which is accurate, quantitative and reproducible.

It is another object of this invention to provide a method and apparatus for determining the flatness or planarity of a plurality of lanes or zones on a surface which is accurate, quantitative and reproducible.

It is a further object of this invention to provide a method and apparatus for determining the flatness or planarity of a surface which is accurate, quantitative and reproducible using a computerized optics technique.

SUMMARY OF THE INVENTION

This invention relates to an apparatus for measuring the flatness of a surface having a length and a width, the apparatus comprising:
  means for generating electrical signals representative of an area in a plane including reflections of a light beam directed at a constant angle of incidence onto a reference line segment parallel to the surface width and at least one line segment across the width of the surface; and
  means for determining the flatness of the surface along the one line segment from the electrical signals utilizing a root mean square function.

The present invention can be described as an apparatus for measuring the flatness of a surface having a length and a width, the apparatus comprising:
  means for generating a substantially coherent beam of light;
  means for directing the beam on the surface at a constant angle of incidence such that the beam is reflected from successive line segments extending across the surface width;
  means for detecting the position of the reflected beam in a plane; and
  means for determining the flatness of an area of the surface from the detected positions utilizing a root mean square function.

The invention is further directed to a method of measuring the flatness of a surface having a length and a width, the method comprising the steps of:
  generating electrical signals representative of an area in a plane including reflections of a light beam directed at a constant angle of incidence onto a reference line segment parallel to the surface width and at least one line segment across the width of the surface; and
  determining the flatness of the surface along the one line segment from the electrical signals utilizing a root mean square function.

The invention further relates to a method of measuring the flatness of a surface having a length and a width, the method comprising the steps of:
  generating a substantially coherent beam of light;
  directing the beam on the surface at a constant angle of incidence such that the beam is reflected from successive line segments extending across the surface width;
  detecting the position of the reflected beam in a plane; and
  determining the flatness of an area of the surface from the detected positions utilizing a root mean square function.

The invention is further directed to a method of measuring the flatness of a surface of a film having a length and a width, the method comprising the steps of:
  (a) placing the film on a support of a transport table, the support moveable in a Z direction;
  (b) directing a laser beam onto a line segment across the width in a X direction of the surface of the film at a constant angle of incidence;
  (c) reflecting the beam from the surface to a screen to present an image of the reflectance showing deviations in a Y direction from a reference line segment;
  (d) sensing the image of reflectance on the screen;
  (e) generating analog electrical signals representative of the reflectance image;
  (f) digitizing and storing the digital signals; and (g) determining the flatness of the surface from the stored signals utilizing a root mean square function.

BRIEF DESCRIPTION OF THE DRAWINGS

The invention can be more fully understood from the following detailed description thereof in connection with accompanying drawings which form a part of this application and in which.

An Appendix containing a listing of a computer program in the Fortran language is appended to this specification following the Detailed Description of the Invention and preceding the claims.

DETAILED DESCRIPTION OF THE INVENTION

Throughout the following detailed description, similar reference characters refer to similar elements in all figures of the drawings.

Figure 1:
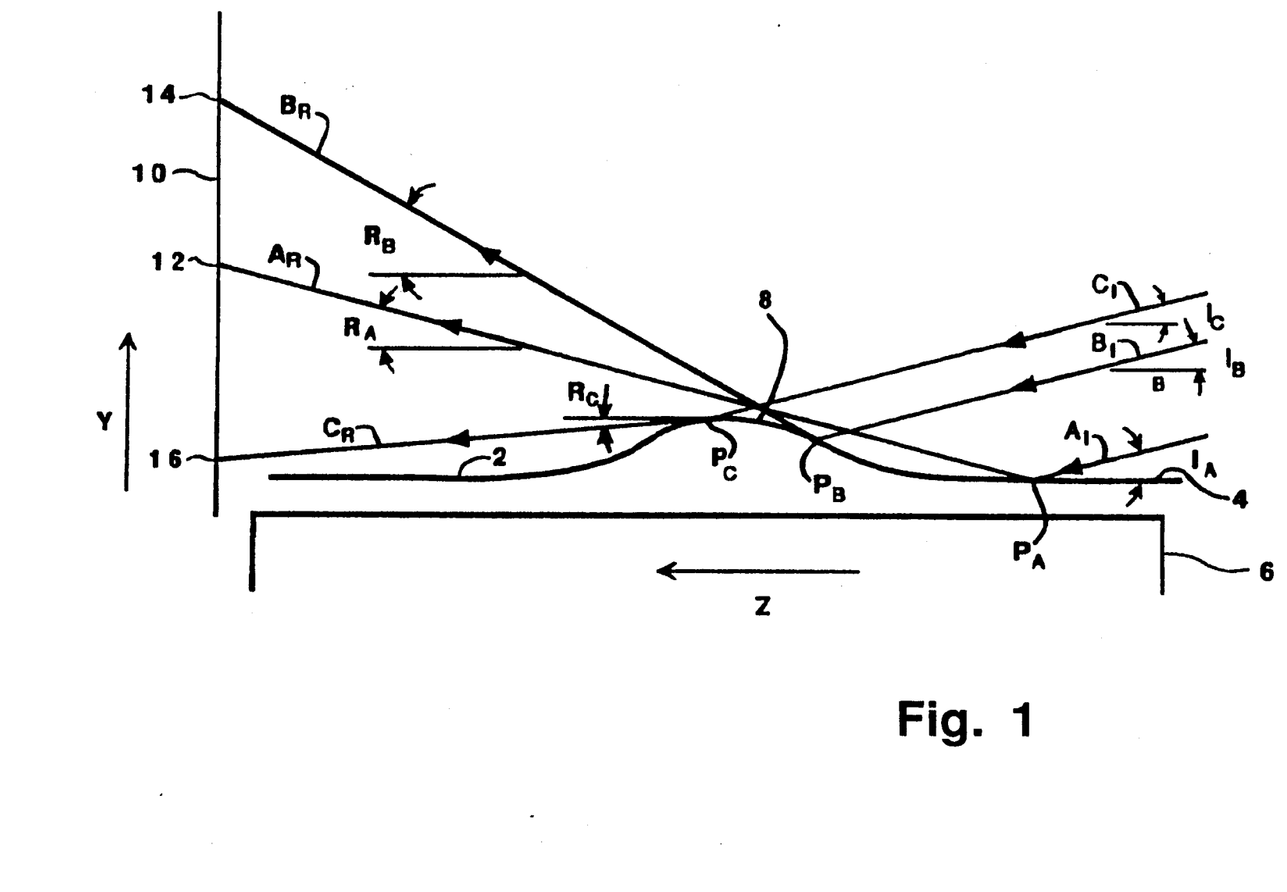
FIG. 1 is a schematic representation showing the principles of optical specular reflectance utilizing light directed on a film surface at different points along an axis.

Referring to FIG. 1, there is illustrated a schematic representation showing the principles of optical specular reflectance utilizing light directed on a film surface 2 at different points along an axis Z. FIG. 1 is a side view of a sheet 4 of film on a support or table 6. The sheet 4 is flat, except for one non-flat region 8 which for the purposes of this illustration can be considered a raised bump or hill symmetric about a vertical axis. A screen 10 extends above and is perpendicular to the support 6.

Line or ray $A_I$ in FIG. 1 represents a planar beam of light directed or incident on the flat top surface 2 of the sheet 4 having an angle of incidence $I_A$ between the planar beam $A_I$ and the flat portion of the sheet 4. The planar beam $A_I$ extends perpendicularly into the sheet of the drawing. When the beam $A_I$ contacts and illuminates a flat line segment on the surface at point $P_A$ normal to the sheet of the drawings, the beam $A_I$ is reflected off the surface 2 at an angle of reflection $R_A$ equal to the angle of incidence $I_A$. The reflected beam $A_R$ can be directed onto the screen 10 producing a straight illuminated line segment, which can be defined as a base or reference line or line segment, normal to the sheet of drawings at the point designated by the reference number 12.

Line or ray $B_I$ in FIG. 1 represents a second planar beam of light directed or incident on the top surface 2 of the sheet 4 across the non-flat region 8 having an angle of incidence $I_B$ from the planar portion of the sheet 4. The second planar beam $B_I$ extends perpendicularly into the sheet of the drawing. When the second beam $B_I$ contacts and illuminates a line segment along the non-flat region 8 of the surface 2 at the point $P_B$ normal to the sheet of drawings, the second beam $B_I$ is reflected off the surface 2 at an angle of reflection $R_B$ less than its angle of incidence $I_B$. When the reflected beam $R_B$ is directed onto the screen 10, it produces a "wave" in its otherwise straight illuminated line segment with a peak, designated by the number 14, in its "wave" from the base line segment 12. This line segment 14 with its "wave" is positioned on the screen 10 above the base line 12 in FIG. 1.

Line or ray $C_I$ in FIG. 1 represents a third planar beam of light directed or incident on the top surface 2 of the sheet 4 of film across the non-flat region 8 having an angle of incidence $I_C$ from the planar portion of the sheet 4. The second planar beam $C_I$ extends perpendicularly into the sheet of the drawing. When the third beam $C_I$ contacts and illuminates the non-flat region 8 of the surface 2 at the point $P_C$ normal to the sheet of drawings, the third beam $C_I$ is reflected off the surface 2 at an angle of reflection $R_C$ greater than its angle of incidence $I_C$. When the reflected beam $C_R$ is directed onto the screen 10, it also produces a "wave" in its otherwise straight illuminated line segment with a peak, designated be the number 16 in its "wave" from the base line segment 12. This line segment 16 with its "wave" is positioned on the screen 10 below the base line segment 12.

Thus, under the principles of optical specular reflectance, a non-flat surface may either increase or decrease the angle of incidence I of an incident beam and produces a "wave" in an otherwise straight line segment across a screen 10 that receives the beam reflected from the surface. Further, a "wave" in a line segment reflected on the screen 10 may occur above or below the base line segment depending on the slope of the surface 2 at the point of incidence.

Specular reflectance of light by a non-flat area will deflect the beam first above the line of perfect planarity (reference line) and second below the reference line until the scan of the non-flat area is completed. The beam can proceed to scanning consecutive or successive line segments that will, to a greater or lesser extent, repeat the same pattern of reflectance until the entire length of the film is scanned. Since the line of perfect planarity is the line of reference, its level of flatness is conventionally defined as zero. Therefore, deflections above this line are defined to have a positive value while those that occur below the line are defined to bear a negative sign.

Since the magnitude of the deviations from a perfectly flat (straight) line segment, as a result of occurrence of non-flat regions, is a direct function of the characteristics of the non-flat regions (area and height), cumulative quantification of such deviations will provide a quantitative measure of the film flatness.

Figures 2, 3:
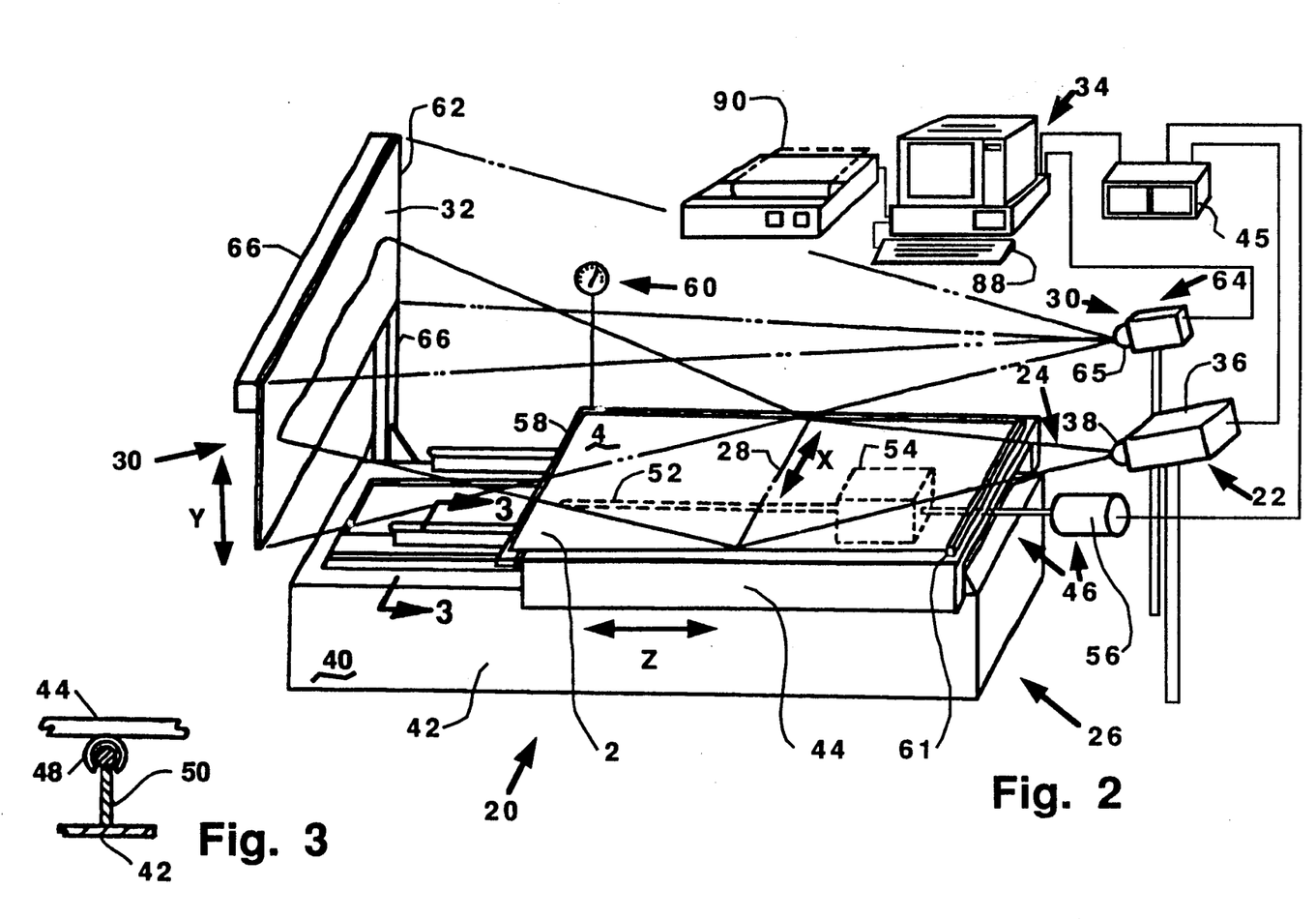
FIG. 2 is a schematic perspective representation of an apparatus for determining or measuring the flatness or planarity of a surface in accordance with the present invention.
FIG. 3 is a sectional view taken along the line 3—3 of FIG. 2 and illustrates one of the film support mounting assemblies of the film table permitting a film support to move linearly with respect to a table base.

In the present invention, the above illustrated principles of optical specular reflectance are used in determining or measuring the flatness or planarity of surfaces utilizing a root mean square function. Referring to FIG. 2, there is illustrated a schematic perspective representation of an apparatus 20 for determining or measuring the flatness or planarity of a surface 2 in accordance with the present invention.

The apparatus 20 comprises means 22 for generating a substantially coherent beam 24 of light; means 26 for directing the beam 24 on the surface 2 at a constant angle of incidence such that the beam 24 is reflected from successive line segments (e.g., one such line segment is designated by the number 28) extending across the width (in the X direction as indicated on FIG. 2) of the surface 2; means 30 for detecting the position of the reflected beam in a plane 32; and means 34 for determining the flatness of an area of the surface 2 from the detected positions utilizing a root mean square function. The generating means 22, the directing means 26, and the detecting means 30 can be described as means 31 for generating electrical signals representative of an area in a plane including reflections of a light beam 24 directed at a constant angle of incidence onto a reference line segment parallel to the surface width and at least one line segment 28 across the width of the surface 2.

The generating means 22 may comprise a stationary laser 36 with a dispersive lens 38 such that the resulting beam 24 is a planar fan shaped beam directed to illuminate one or substantially one of the line segments 28. The dispersive lens 38 can be described as means for focusing the beam 24 such that the beam 24 has a substantially linear cross section that is directed onto the successive surface line segments 28. An illustrative laser 36 and lens 38 combination is a LAHARCO laser device under model 8202 with a 60 degree lens, available from Lacey-Harmer Supply & Mfg. Co., Portland, Oreg.

The directing means 26 may comprise a transport table 40 having a base 42; a film support 44 connected to the base 42 such that the film support 44 can slide linearly (in the Z direction as indicated in FIG. 2) with respect to the base 42; and means 46 for moving the support 44 in a linear direction with respect to the laser 36 such that successive surface line segments 28 are positioned to reflect the fan shaped beam 24.

Preferably, the table 40 has a non-reflective, e.g., black, support surface upon which the film is mounted. Further, preferably the support surface is sufficiently large to permit scanning of samples of film with lengths of 80 inches and widths of 72 inches. However, a typical film sample size is 60 inches by 40 inches. Transport tables, suitable for use as table 40, are commercially available, such as a 72 inches by 80 inches indexing table under the name Proto-Automation Table from Proto-Automation & Manufacturing, Inc., Rock Hill, S.C.

The support 44 can be connected to the base 42 by a pair of bearing sleeves 48 sideably connected to a pair of parallel rails 50. The rails 50 can be connected to the base 42 and the sleeves 48 connected to the support 44, or vice versa. The connection of one set of the rails 50 and sleeves 48 is illustrated in FIG. 3. Preferably, the support 44 is positioned with respect to the laser 36 such that the beam 24 strikes the surface 2 at an incident angle beyond the critical angle, the least angle of incidence for which total reflection will occur. For a typical film material, such as Mylar ®, a suitable angle of incidence is or is about 77 degrees from normal to the surface 2.

The moving means 46 may comprise a screw shaft 52 threadably connected to a block 54 connected to an underside of the support 44; and a stepping motor 56 connected to the screw shaft 52 such that when the motor 56 is energized it is adapted to rotate the screw shaft 52 thereby moving the block 54 and, thus, the support 44 along the shaft 52 linearly towards or away from the laser 36.

The motion of the support 44 can be regulated by a programmable motion controller 45 that can be programmed to periodically activate the stepping motor 56. Preferably, the motion controller 45 is programmed to advanced the film support 44 at one-inch increments with appropriate pauses to allow capture of the reflected images (on a screen 62) of the line segments 28 (by a two-dimensional video camera 64).

In cases where the flatness of a sheet of film under tension is desired to be measured, a sheet of film can be affixed to the film support 44 at a leading edge and a trailing edge of the sheet. For instance, the leading edge can be held by a tension bar 58 connected to the support 44 where the tension bar 58 is capable of being moved a small distance, such as, away from the laser 36, to enable the operator to apply tension to the film, the tension being measurable on, for instance, a gauge 60. In any event, the film is laid on the support 44 with special care taken to purge air pockets from underneath the film sample. The support 44 can then move the film under the fixed-in-position laser beam 24 so that successive line segments 28 extending across the width of the surface 2 along the entire length of the film may be scanned or illuminated by the beam 24.

A calibration strip 61 can be attached at the trailing end across the width of the top of film support 44. The calibration strip 61 has a reflective surface like a mirror on its top surface. This strip 61 is positioned in the path of the beam 24 when calibration the apparatus 20.

The detecting means 30 may comprise a screen 62 having a white surface for receiving the reflected beam; and means 64 for sensing and for generating analog electrical signals representative of the position of the reflected beam on the screen 62. The screen 62 may be hung on a member 66 connected to the base 42 such that a surface of the screen 62 is positioned in the plane 32 and is perpendicular or substantially perpendicular to the film surface 2 when the film is positioned on the support 44. The sensing means 64 may be a stationary video or TV camera capable of sensing in two dimensions when used in conjunction with a lens 65. A filter, such as a narrow pass band filter, which transmits the laser wavelength and substantially blocks all other wavelengths may be used to attenuate the effects of ambient light on the signal generated by the camera 64. One suitable video camera is a Sony camera having model XC-77 CCD B/W with a charged coupled target device (CCD) having an array of 768 by 493 pixels or picture elements and having a sensing area of 8.8 millimeters by 6.6 millimeters commercially available from Chori American, New York, N.Y. An acceptable lens 65 is a Cosmicar lens, model C20800, 8.5 mm, available from Loss Prevention Electronics, Annapolis, Md.

The determining means 34 preferably comprises a computer system 70 for converting analog signals to digital signals and for determining or measuring the flatness or planarity of a line segment or an area on the surface 2 from the electrical signals.

Figure 4:
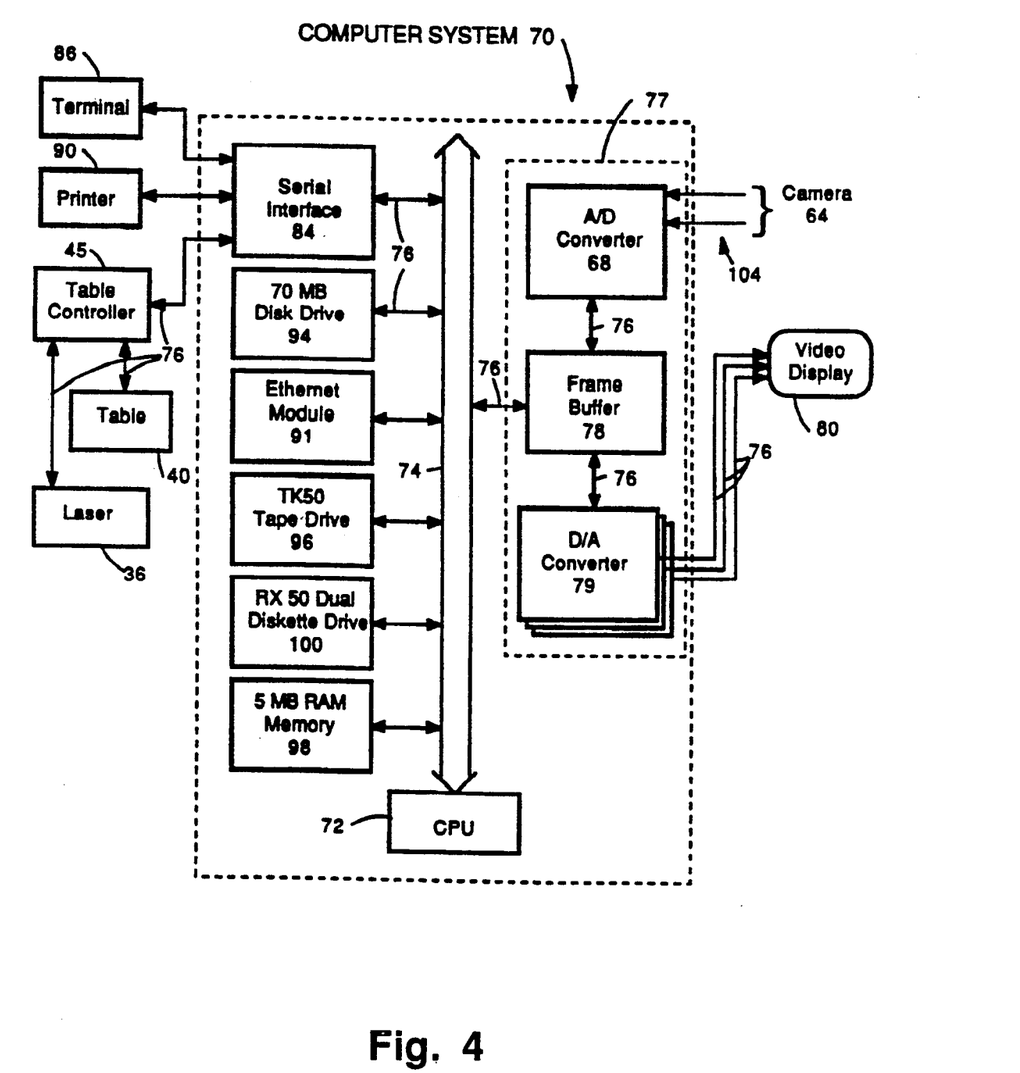
FIG. 4 is a schematic representation of the computer system of FIG. 2.

FIG. 4 is a schematic representation of a preferred embodiment for the computer system 70. The computer system 70 comprises a central processing unit (CPU) 72 connected by an internal data bus 74 and interconnecting lines 76 to (1) an image digitizer 77 which includes an analog to digital (A/D) converter 68 connected to a frame buffer 78 connected to three digital to analog (D/A) converters 79 which are connected to a video display 80, (2) a serial interface 84 which is connected to a color video terminal 86 with operator input means 88, such as, a keyboard, a keypad, a mouse and/or a light pen, a printer 90, and the programmable motion controller 45, (3) an ethernet module 91 for connection to an ethernet cable and (4) means for storing one or more operating programs and data generated by the apparatus 20, such as, one or more of a hard disk storage and drive device 94, a magnetic cassette tape storage and drive device 96, a random access memory (RAM) 98, and/or a floppy disk or diskette storage and drive device 100. The frame buffer 78 is connected by lines 102 to the analog to digital converter 68. The analog to digital converter 68 is connected by lines 104 to receive signals from the video camera 64.

For illustration purposes, the following parts can be obtained from Digital Equipment Corporation (DEC) of Marlboro, Mass., under the following specified model numbers:

| | |
|---|---|
| the central processing unit (CPU) 72 | model 630QB-A2 |
| the serial interface 84 | model DVQ-11-M |
| the video terminal 86 | model VT-220AZ |
| the disk storage and drive device 94 | models RD-50A-5A and RQDX3-BA |
| the tape storage and drive device 96 | models TK-50-AA and TQK-50-BA |
| the memory 98 | model CMX-830 |
| and | |
| the diskette storage/drive device 100 | models 800-Kb and RX50-A-BA. |

An acceptable image digitizer 77 useable in the present system can be obtained from Data Translation Incorporated located in Marlboro, Mass., under model number DT-2651.

The computer system 70 is programmed to calculate the flatness or planarity parameter or factor $F_Q$ as follows:

$$F_Q = \left[ 1/n \sum_{i=1}^{n} (Hi)^2 \right]^{\frac{1}{2}}$$

where:

n = number of scans per sample;

Hi = Y-coordinate (height) of the reflected line segment image (the deviation or wave from the reference line segment 12) at each X-position (across the width of the surface 2) for scan i; and $F_Q$ = flatness parameter or factor.

This mathematical equation provides for a cumulative measure of the deflections while avoiding cancellation of the deflections of equal magnitudes with opposite signs.

The computer system 70 can be further programmed to calculate the mean $F_A$ and standard deviation $D_S$ of the Y-coordinates. It should be noted that the Y-coordinates are related to the non-flatness of the film surface 2 but by no means are the Y-coordinates directly related to the film height at that point (height from flat support 44). In fact, the deflection is influenced to a much greater extent by the slope of the non-flat spots on the film.

Software in the computer system 7 is capable of providing additional information. For instance, the flatness $F_Q$, mean $F_A$ and/or standard deviation $D_S$ of the film surface edge portions or zones can be provided. The film surface edge portions or zones are defined as rectangular, or potentially square, areas of the film surface immediately adjacent the two edges of the film running in the Z direction. The width of these edge portions or zones is operator selectable, but has a default of a predetermined distance, e.g., 3 inches, in the event that the operator does not input a different dimension for the width of the edge portions. The flatness $F_Q$, mean $F_A$ and standard deviation $D_S$ of one or more strips or lanes in the area between the edge portions can be provided where the number of lanes is set by the operator or controlled by a default, such as two lanes. A lane is defined as a rectangular, or potentially square, area of the film surface immediately adjacent one of the two edge portions or another lane of the film surface which extends generally the entire length (Z direction) of the surface 2. Further, the magnitude as well as the exact location of a set (e.g., 5) of the largest deviations or deflections (Y coordinates) from a reference line 12 encountered during the scan of the entire film surface sample can be provided.

In addition, the apparatus can provide the flatness $F_Q$, mean $F_A$ and/or standard deviation $D_S$ of one or more patch or specialized lane anywhere on the surface 2 defined by the operator by inputting dimensions through the keyboard 88 the size and location of a desired square or rectangle anywhere on the surface 2.

Furthermore, the apparatus can display, for instance, on terminal 86 a three dimensional representation of the X, Y and Z coordinates providing a visual representation of the terrain of the surface 2.

The operation of the aforedescribed apparatus 20 will now be explained with reference to the block diagram shown in FIG. 5 which includes actions performed by the program attached in the Appendix. At 110 the operator energizes the hardware by turning the power on, for instance, to the computer system 70, the transport table 40, the laser 36 and the camera 64. At 112 the operator loads the software from the hard disk storage and drive device 94 to the random access memory 98 to increase the speed of processing. This is accomplished by typing "RUN FLATNESS" and then pressing the return key on the keyboard 88. Once loaded, block 114 illustrates the software initializing the computer system 70 causing basic functions in the computer system 70 to be initialized or set. For instance, various parameters such as logic flags, variables, and variable arrays are established. Further, certain defaults are set and communications are established between the computer system 70 and other parts, such as the motion controller 45, the camera 64 and the laser 36 to determine whether the other parts are energized. The operator typically loads a film sample onto the table support 44 any one of (1) before turning the power on 110, (2) after turning the power on and before loading the program, or (3) immediately after the program is loaded during or after the initialization 114. Block 115 illustrates loading the film immediately after the apparatus is initialized. After initialization, the software causes the video terminal 86 to display a menu on its screen as illustrated by block 116.

Block 118 lists the menu options as follows: (1) calibrate, (2) image analysis, (3) routine analysis, (4) nonroutine analysis, and (5) exit program. Block 120 illustrates the step of the operator selecting one of the menu options by using arrow keys on the keyboard 88 to selectively position a cursor on the screen of the video terminal 86 and then pressing the enter or return key. Lines 1378–1568 of the appended software enable this function.

Figure 5:
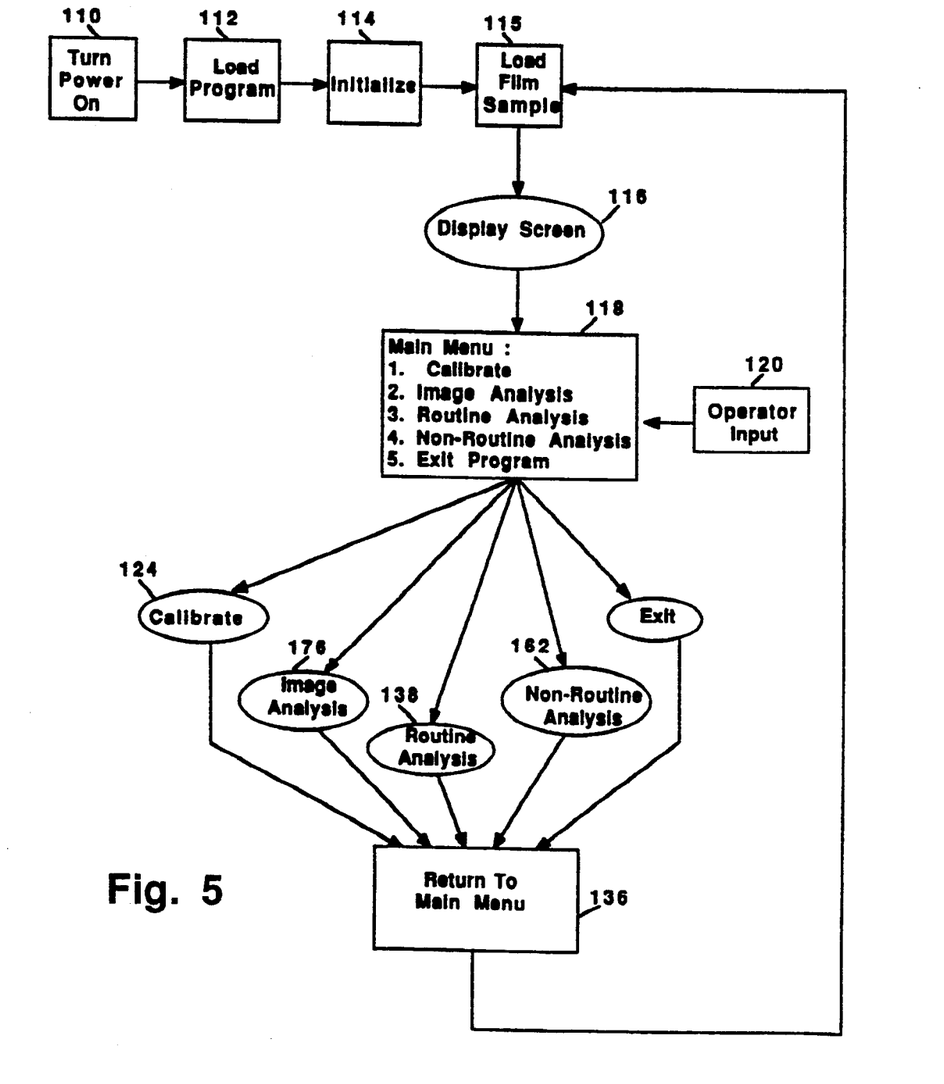
FIG. 5 is a flow diagram of the overall operation of the surface flatness measuring apparatus in accordance with the present invention.
Figure 6:
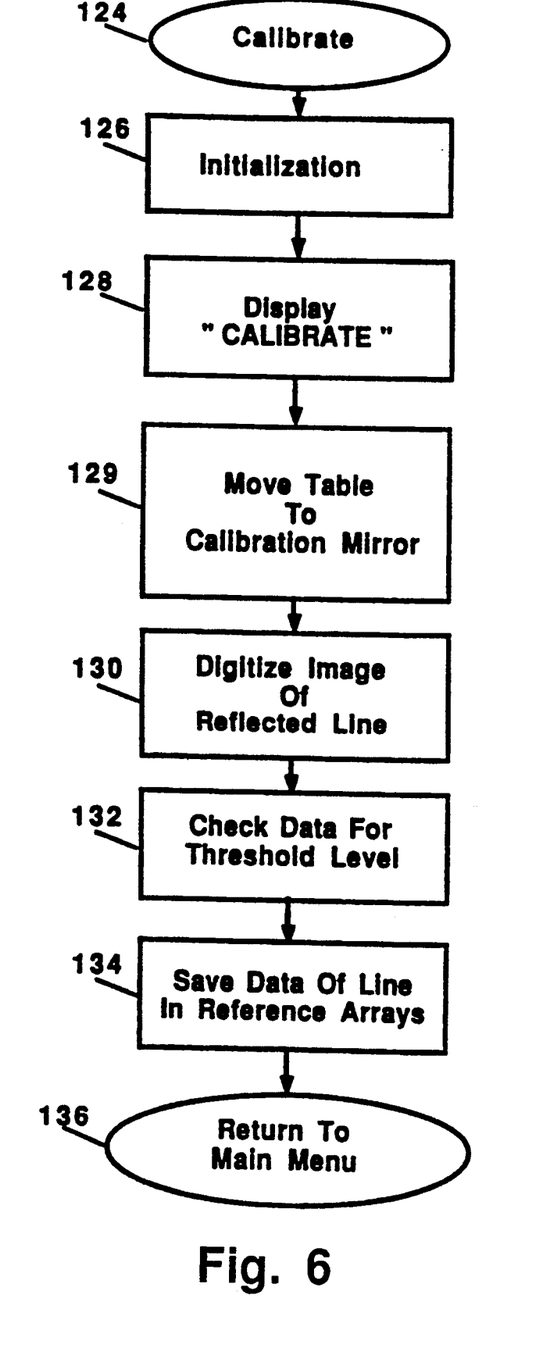
FIG. 6 is a detailed flow diagram of the calibration steps capable of being performed by the surface flatness measuring apparatus in accordance with the present invention.

Assuming that the operator selected option (1) to "calibrate" the apparatus 20 from the main menu illustrated at block 118 in FIG. 5, the software then begin the calibration steps illustrated by the block 124. Line 1618 of the appended software begins this process. FIG. 6 is a detailed flow diagram of the calibration steps capable of being performed by the surface flatness measuring apparatus in accordance with the present invention. Lines 1618–1918 of the software enable the calibration steps.

Referring to FIG. 6, the first step in the calibrate mode or process is initialization of the apparatus 20 as illustrated by the block 126. More specifically, the software automatically sets up status parameters, sets logic flags to starting values for the routine to be performed, and similarly initializes system components to be ready to operate. If they are not energized or otherwise operational, an appropriate message will be displayed on the screen of the video terminal 86.

Then as represented at 128 the software displays the word "CALIBRATE" on the terminal 86 while the calibration of the apparatus 20 is being performed. After the calibration steps, line 1909 of the software removes the word "CALIBRATE" from the terminal 86.

As the next step in the calibration process indicated by the block 129, a signal is sent from the computer system 70 to the motion controller 45 which energizes the stepping motor 56, as appropriate, to move the film support 44 to a calibrate position. In the calibrate position, the beam 24 is directed across the reflective surface of the calibration strip 61.

Block 130 indicates the steps of capturing the reflected image of the beam line segment 28 onto the screen 62 by the camera 64, digitizing in converter 68 the analog signal created by the camera 64 and temporarily storing 512 by 480 pixels, pixel elements or bytes of information in the frame buffer 78. Each byte is given an 8 bit value representative of one of 256 possible intensity values.

Box 132 indicates that each byte is then compared with a predetermined, preprogrammed threshold value of level. If the byte has a light intensity value at or above the threshold value, then the byte information is stored in the memory 98 in a reference array or matrix of X (width across the film surface 2) and Y (height deviation from the surface of the support 44) coordinate values and intensity values as indicated by the block 134. If the byte has a light intensity value below the threshold value, then a flag is set to indicate the light intensity value of the byte is below the threshold value and then the byte of information is stored in the memory 98 in the reference array or matrix of X (width across the film surface 2) and Y (height deviation from the surface of the support 44) coordinate values and intensity values as indicated by the block 134.

Then as illustrated by the block 136 the software then causes the main menu to be redisplayed.

Figure 8:
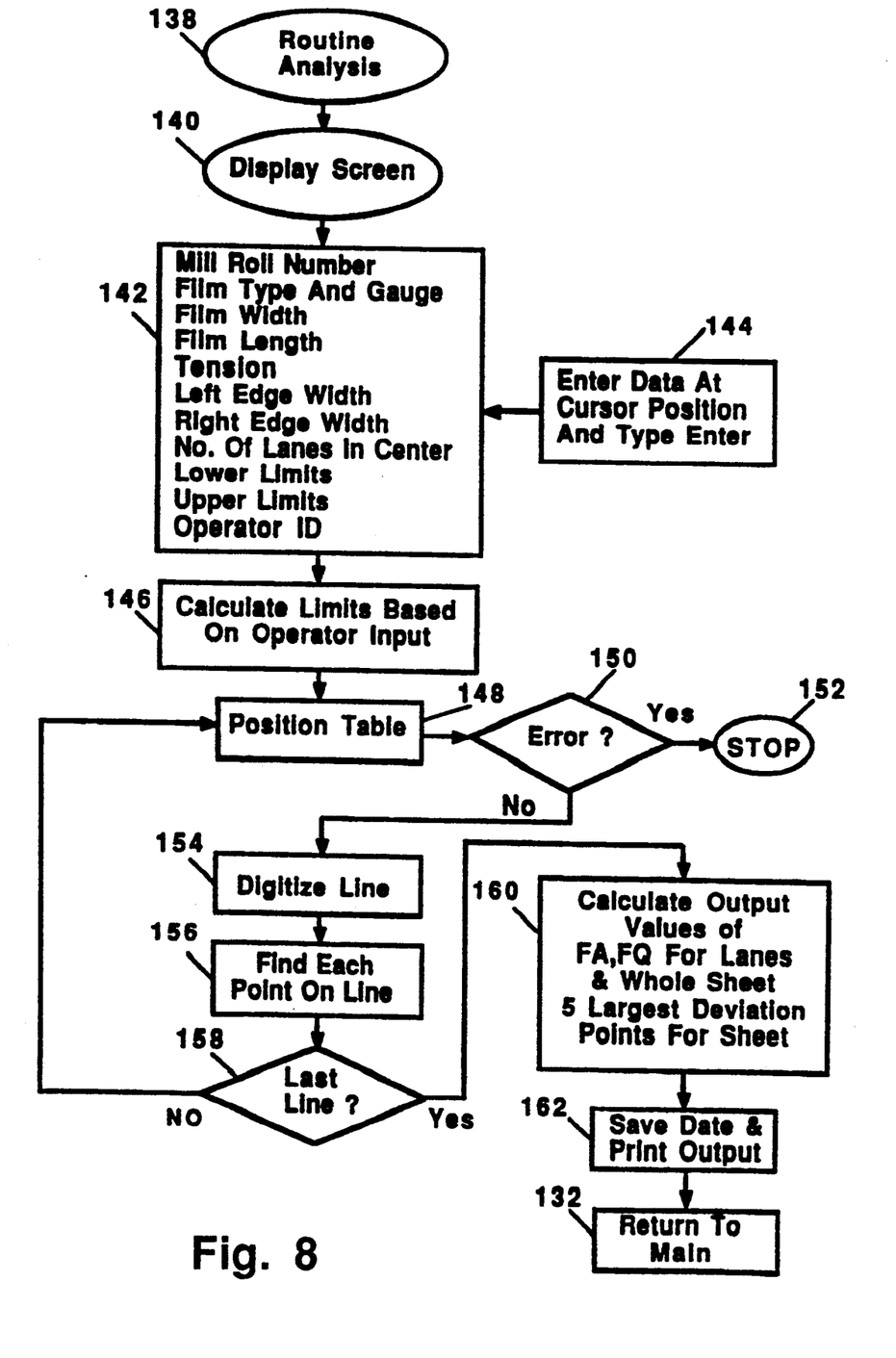
FIG. 8 is a detailed flow diagram of the routine analysis steps capable of being performed by the surface flatness measuring apparatus in accordance with the present invention.

Assuming that the operator selected option (3) to do "routine analysis" from the main menu illustrated at block 118 in FIG. 5, the software switches or jumps (see block 122) to perform the "routine analysis" steps illustrated by the block 138 in FIG. 5. FIG. 8 is a detailed flow diagram of the "routine analysis" steps capable of being performed by the surface flatness measuring apparatus in accordance with the present invention. Lines 2359–3695 of the software enable the routine analysis steps.

Referring to FIG. 8, the first steps of the routine analysis mode or process are sending a control signal to the table controller 45 to open a shutter in the laser 36 to permit the beam 24 to illuminate one of the line segments 28 on the film surface 2 and displaying on the screen of the video terminal 86 a routine analysis information chart for operator input. This is illustrated by the block 140.

Block 142 lists the information provided and requested on the routine analysis information chart. Specifically, the chart provides a space for the operator to input the mill roll number, the film type and gauge, the film width (X direction), film length (Z direction), tension (from the gauge 60), the film edge portion width (X direction), the number of lanes between the edge portions to be independently analyzed, the lower limit to be analyzed on the screen 62 (Y direction), the upper limit to be analyzed on the screen 62 (Y direction), and the operator identification code. Inputting lower and upper (Y coordinate) limits close to one another reduces the number of the pixels analyzed speeding up the process, but if chosen to close will not include all deviation points on the screen 62.

As indicated at block 144, the operator may input data or information on the routine analysis information chart by moving the cursor around the screen by either the arrow keys or by pressing the tab key and using the alpha and numeric characters on the keyboard 88 to input the data or information in the spaces provided.

Next, at block 146 the computer system 70 determines which pixel elements are to be used in the image analysis based on the operator inputs and defaults.

Then, as indicated at block 148, the computer system 70 sends a signal to the motion controller 45 which energizes the stepping motor 56, as appropriate, to move the film support 44 to a first image analysis scanning position where the beam 24 is directed across one of the line segments 28, for instance, closest to the leading edge of the film surface for the area of interest.

As indicated by the block 150, a signal returns from the motion controller 45 to the computer system 70 indicating whether or not the table support 44 properly responded to the instruction to move into position. If the support 44 did not properly respond, then as represented at block 152 an error message is displayed on the video terminal 86 and the analysis does not proceed until the operator corrects the problem. If the signal indicates that there was no error, then the reflected line segment 28 is captured or grabbed by the camera 64, digitized by the analog to digital converter 68 and stored in the frame buffer 78 as indicated by block 154.

Then as indicated at block 156, the maximum or peak intensity value $I_{MAX}$ for each X value is found or determined which defines the Y coordinate corresponding to each X value or coordinate of the line segment 28. This is done by performing the following.

First, a first one of the two ends of the line segment 28 is determined by (1) choosing a X coordinate lower than the first X coordinate of the desired sample area, (2) checking the intensity value at each Y coordinate having the chosen X value to see if it is above the threshold value referred to in reference to blocks 132 and 134 and (3) then increasing the X coordinate one at a time until a set of X and Y coordinates is found with an intensity value greater than the threshold value referred to in reference to blocks 132 and 134. This set of X and Y coordinates is assumed to be one of the ends of the line segment 28.

Second, a second one of the two ends of the line segment 28 is determined by (1) selecting a chosen X coordinate by calculating the X coordinate of the other end from the information inputted by the operator in reference to block 142 and adding a short distance to get beyond the edge of the desired sample area, (2) checking the intensity value at each Y coordinate having the chosen X value to see if it is above the threshold value referred to in reference to blocks 132 and 134 and (3) then decreasing the X coordinate one at a time until a set of X and Y coordinates is found with an intensity value greater than the threshold value referred to in reference to blocks 132 and 134. This set of X and Y coordinates is assumed to be the other one of the ends of the line segment 28.

Third, starting at one of the determined ends, e.g., the first end, of the line segment 28, for each X value or coordinate of the line segment 28 the intensity value for each Y coordinate having the specified X coordinate is compared with another one of the Y coordinates having the same X coordinate. The intensity value of the Y coordinate having the maximum intensity value from the previous comparison is compared with another one of the Y coordinates having the same X coordinate until the intensity value of the last Y coordinate having the specified X coordinate is compared with the intensity value of the Y coordinate having the maximum intensity value from the previous comparison. The Y coordinate having the maximum or peak intensity value $I_{MAX}$ of the last comparison is defined to be the Y coordinate of the line segment 28 for the selected X coordinate. This process is repeated for each X coordinate until the Y coordinates are found for each X coordinate along the line segment 28. If two or more of the intensity values for each of the Y coordinates having the selected X coordinate are the same, then any one of such Y coordinates can be chosen as the Y coordinate of the line segment 28 for that selected X coordinate. If none of the intensity values for each of the Y coordinates having the selected X coordinate are above the threshold value referred to in reference to blocks 132 and 134, then the program inserts a "flag" at these selected X coordinates for later analysis.

Fourth, after all of the X coordinates are selected and compared as discussed above, then a linear interpolation is performed to determine the Y coordinates of the "flagged" X coordinates. In other words, the missing Y values are assumed and calculated to be on a straight line between the Y coordinates of the two closest (i.e., closest to the "flagged" X coordinates and on either side of the "flagged" X coordinate) non-flagged X coordinates for which Y coordinates were found.

Then at block 158 the line segment is displayed on the video display 80 with the first and second ends of the line segment 28 highlighted so that the operator can visually observe whether the program is operating as expected. If the line segment 28 was not the last line segment 28 in the area chosen by the operator in step 144, then the program repeats the steps described in reference to blocks 148, 150, 152, 154 and 156 for each consecutive or successive line segment 28 a set distance apart, e.g., 1 inch, from the previously captured line segment 28 until all the line segments 28 are so analyzed.

Then as indicated at block 160 the flatness $F_Q$, the mean $F_A$ and/or the standard deviation $D_S$ is calculated for each lane selected in step 142, for each edge zone defined in step 142 and for the whole sample surface area defined in step 142. Further, a predetermined number, e.g., 5, of the highest and lowest peaks or deviations (Y coordinates) from the base line 12 are found. Other information can be determined including, such as, the time and date of the analysis.

As indicated at block 162, this calculated and other information is saved on the disk drive 94 and, of course, is capable of being reviewed by the operator on the screen of the terminal 86 and/or printed out on the printer 90.

Then as indicated by the block 136, the software automatically redisplays the main menu which is symbolized by the line from block 136 to block 116 in FIG. 5. At this time the operator can remove the analyzed film sample off and load another sample on the table 40. Of course, the operator might select another option from the main menu at 118 to be performed on the same or a new film sample.

Figure 9:
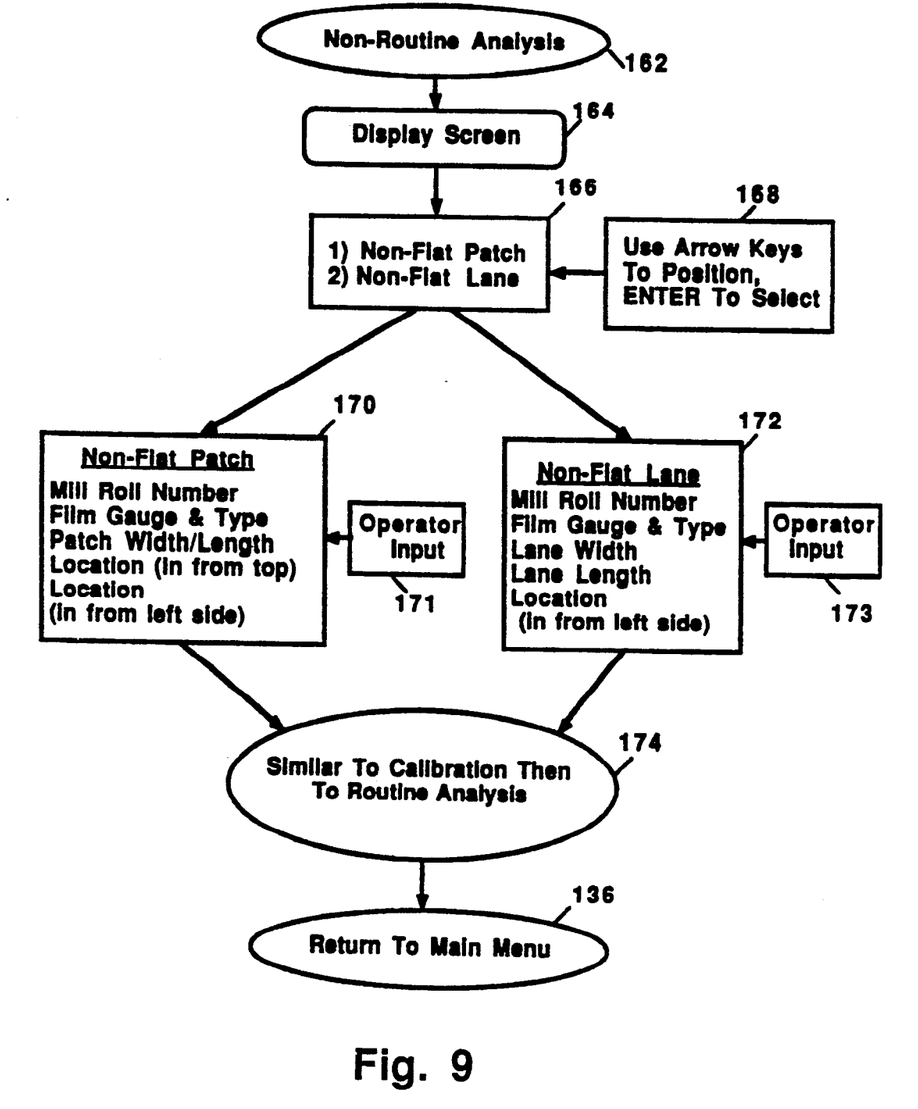
FIG. 9 is a detailed flow diagram of the non-routine analysis steps capable of being performed by the surface flatness measuring apparatus in accordance with the present invention.

Assuming that the operator selected option (4) to perform non-routine analysis from the main menu illustrated at block 118 on FIG. 5, the software then begins the steps illustrated by the block 162. FIG. 9 is a detailed flow diagram of the non-routine analysis steps capable of being performed by the surface flatness measuring apparatus in accordance with the present invention. Lines 3733–5581 of the software enable the non-routine analysis steps.

Referring to FIG. 9, as indicated by block 164, the first step of the computer system 70 of the non-routine analysis is to display on the screen of the video terminal 86 a non-routine analysis menu. Block 166 shows the two options provided on the screen as (1) non-flat patch and (2) non-flat lane. A non-flat patch is defined to be a square of rectangular area on the surface 2 where the location of the patch is selected by inputting the patch width (X dimension), the patch length (Z dimension), the distance (X dimension) from the left edge of the surface 2, and the distance (Z dimension) from the leading edge of the surface 2. A non-flat lane is defined to be a square of rectangular area on the surface 2 where the location of the lane is selected by inputting the lane width (X dimension), the lane length (Z dimension), the distance (X dimension) from the left edge of the surface 2, and the lane is predefined to begin at the leading edge of the surface 2.

As indicated at block 168 the operator selects one of the two non-routine analysis menu options by using the arrow keys and entering the selection on the keyboard 88.

Assuming that the operator selected the non-flat patch option, the software causes an information chart to be displayed on the terminal 86 as illustrated by the block 170. At block 171, the operator may input data or information on the non-flat patch information chart by moving the cursor around the screen by either the arrow keys or by pressing the tab key and using the alpha and numeric characters on the keyboard 88 to input the data or information in the spaces provided. Otherwise, certain defaults will be assumed.

Upon entry of such information, as indicated by the block 174, the software performs the steps previously described in relation to blocks 126, 128, 129, 130, 132, and 134 of the calibration process and then performs the steps previously described in relation to blocks 148, 150, 152, 154, 156, 158, 160, 162, and 136 of the routine analysis process. However, in the first table support positioning step 148, the support 44 is positioned such that the beam 24 is directed on the leading line segment in the desired patch defined by the operator. Further, although the entire width of the surface is captured by the camera 64 in step 154, only the pixels of the reflected line segment image in the defined patch are used for the calculations in the step illustrated by the block 160.

On the other hand, assuming that the operator selected the non-flat lane option from the non-routine analysis menu illustrated in block 166, the software causes an information chart to be displayed on the terminal 86 as illustrated by the block 172. At block 173, the operator may input data or information on the non-flat lane information chart by moving the cursor around the screen by either the arrow keys or by pressing the tab key and using the alpha and numeric characters on the keyboard 88 to input the data or information in the spaces provided. Otherwise, certain defaults will be assumed.

Upon entry of such information, as indicated by the block 174, the software similarly performs the steps previously described in relation to blocks 126, 128, 129, 130, 132, and 134 of the calibration process and then performs the steps previously described in relation to blocks 148, 150, 152, 154, 156, 158, 160, 162, and 136 of the routine analysis process. However, in the first table support positioning step 148, the support 44 is positioned such that the beam 24 is directed on the leading line segment in the desired lane defined by the operator. Further, although the entire width of the surface is captured by the camera 64 in step 154, only the pixels of the reflected line segment image in the defined lane are used for the calculations in the step illustrated by the block 160.

Figure 7:
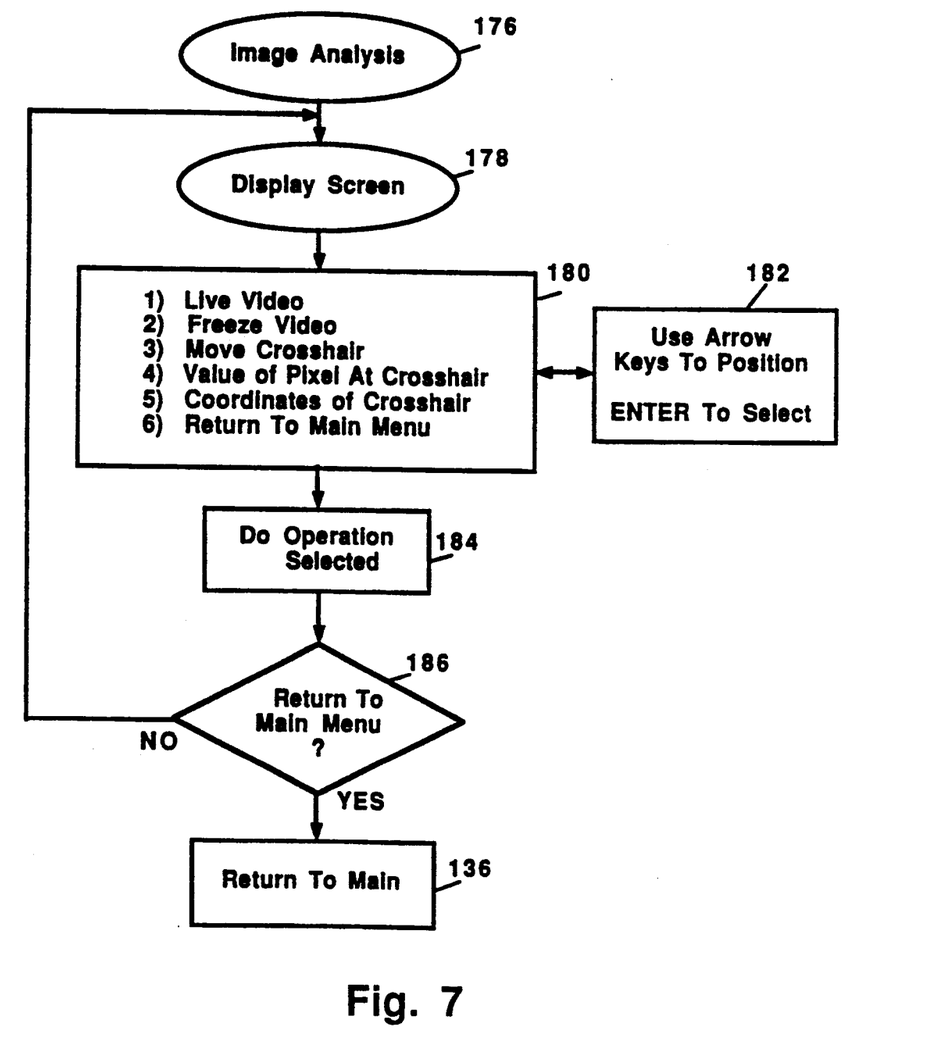
FIG. 7 is a detailed flow diagram of the image analysis steps capable of being performed by the surface flatness measuring apparatus in accordance with the present invention.

Assuming that the operator selected option (2) to perform image analysis from the main menu illustrated at block 118 on FIG. 5, the software then begins the steps illustrated by the block 176. FIG. 7 is a detailed flow diagram of the image analysis steps capable of being performed by the surface flatness measuring apparatus in accordance with the present invention. Lines 1920-2357 of the Appended software enable the image analysis steps.

Referring to FIG. 7, as indicated by block 178, the first step of the computer system 70 of the image analysis is to display on the screen of the video terminal 86 an image analysis menu. Block 180 shows the six options provided on the screen as (1) live video, (2) freeze video, (3) move cross hair, (4) value of pixel at cross hair, (5) coordinates of cross hair, and (6) return to the main menu illustrated at block 118.

As indicated at block 182, the operator selects one of the six image analysis menu options by using the arrow keys and entering the selection on the keyboard 88.

Next as illustrated by the block 184, the function of the selected option is performed. Assuming that the operator selected the first option (i.e., (1) live video option), the computer system 70 causes the video display 80 to continuously display what is captured or viewed by the camera 64. Assuming that the operator selected the second option (i.e., (2) freeze video option), the computer system 70 causes the frame buffer 78 to hold or save a still, single or frozen image of what is captured or viewed by the camera 64 and to display the frozen image on the video display 80. Assuming that the operator selected the third option (i.e., (3) move cross hair option), the computer system 70 creates a cross hair, i.e., a plus shaped cursor, and causes it to move through the use of arrow keys on the keyboard 88 on the video display 80 to position the cross hair on a point of a frozen image (in accordance with option (2) freeze video) selected by the operator. Assuming that the operator selected the fourth option (i.e., (4) value of the pixel at cross hair option), the light intensity value I (i.e., a number between 1 and 256) for the point indicated by the cross hair on the video display 80 is shown on the video terminal 86. Assuming that the operator selected the fifth option (i.e., (5) coordinates of the pixel at cross hair option), the X and Y coordinates or values for the point indicated by the cross hair on the video display 80 is shown on the video terminal 86.

Once the operation is performed as indicated by the block 184, the image analysis menu is redisplayed as indicated by the block 186 unless the sixth option (i.e., (6) return to main menu) was selected by the operator. Several of the options can be selected at the same time. For instance, any or all of options (2), (3), (4) and (5) can be selected at the same time. In the event that the operator selects the sixth option, the other options from the image analysis menu are terminated and the main menu illustrated at block 118 is redisplayed.

The fifth option on the main menu as shown on block 118 in FIG. 5 is to exit the program which if selected enables the operator to log off the computer system 70 and turn the power off to the apparatus 20.

The aforedescribed method and apparatus are particularly suited for detecting and quantitatively measuring the planarity or flatness of polyester films, such as Mylar ® and Cronar ® having thicknesses ranging from 0.3 millimeters to 14 millimeters. However, the present invention may be used to determine the planarity of virtually any other reflective surfaces, such as metals, glass, non-polyester films and other substrates. With some modifications of the transport table 40 or the programming of the computer system 70, the present invention can also be used to determine the flatness of molded structures, cast fixtures and other non-sheet reflective surfaces.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. An apparatus for measuring the flatness of a surface having a length and a width, the apparatus comprising:
   means for generating electrical signals representative of an area in a plane including reflections of a light beam directed at a constant angle of incidence onto a reference line segment parallel to the surface width and at least one line segment across the width of the surface; and
   means for determining the flatness of the surface along the one line segment from the electrical signals utilizing a root mean square function.

2. The apparatus of claim 1, wherein the generating means comprises:
   means for generating a substantially coherent beam of light;
   means for directing the beam on the surface at a constant angle of incidence such that the beam is reflected from successive line segments extending across the surface width; and
   means for detecting the position of the reflected beam in a plane and for generating the electrical signals.

3. The apparatus of claim 2, further comprising means for focusing the beam such that the beam has a substantially linear cross section that is directed onto the successive surface line segments.

4. The apparatus of claim 3, wherein the directing means comprises:
   a support for supporting the surface;
   means for moving the support in a linear direction such that the successive surface line segments are positioned to reflect the linear beam.

5. The apparatus of claim 4, wherein the moving means comprises:
   a screw shaft threadably connected to the support; and
   a stepping motor connected to the screw shaft.

6. The apparatus of claim 2, wherein the detecting means comprises:
   a screen for receiving the reflected beam; and
   means for sensing and for generating analog electrical signals representative of the position of the reflected beam on the screen; and wherein the determining means comprises:
   means connected to the sensing means for converting the analog signals to digital signals; and
   a computer system connected to the converting means for determining the flatness along the successive line segments from the electrical signals.

7. The apparatus of claim 1, wherein the determining means utilizes the equation:

$$F_Q = \left[ 1/n \sum_{i=1}^{n} (Hi)^2 \right]^{\frac{1}{2}}$$

where
   n = number of scans;
   Hi = Y-coordinate of the signal at each X-position for scan i; and
   $F_Q$ = flatness factor.

8. The apparatus of claim 1, wherein the determining means is further capable of determining a set of highest deviation values from a reference.

9. The apparatus of claim 1, wherein the determining means is further capable of calculating deviations of the detected reflected signals from a reference line for use in the root mean square function.

10. The apparatus of claim 1, wherein the determining means is further capable of calculating the flatness $F_Q$, the mean $F_A$ and/or the standard deviation $D_S$ of (a) film surface edge portions or zones, (b) one or more strips or lanes in the area between the edge portions or zones, and/or (c) one or more patch or specialized lane anywhere on the surface.

11. An apparatus for measuring the flatness of a surface having a length and a width, the apparatus comprising:
   means for generating a substantially coherent beam of light;
   means for directing the beam on the surface at a constant angle of incidence such that the beam is reflected from successive line segments extending across the surface width;
   means for detecting the position of the reflected beam in a plane; and
   means for determining the flatness of an area of the surface from the detected positions utilizing a root mean square function.

12. The apparatus of claim 11, further comprising means for focusing the beam such that the beam has a substantially linear cross section that is directed onto the successive surface line segments.

13. The apparatus of claim 11, wherein the directing means comprises:
   a support for supporting the surface;
   means for moving the support in a linear direction such that the successive surface line segments are positioned to reflect the linear beam.

14. The apparatus of claim 13, wherein the moving means comprises:
   a screw shaft threadably connected to the support; and
   a stepping motor connected to the screw shaft.

15. The apparatus of claim 11, wherein the detecting means comprises:
   a screen for receiving the reflected beam; and
   means for sensing, and for generating analog electrical signals representative of, the position of the reflected beam on the screen; and wherein the determining means comprises:
   means connected to the sensing means for converting the analog signals to digital signals; and
   a computer connected to the converting means for determining the flatness of the area from the electrical signals.

16. The apparatus of claim 11, wherein the determining means utilizes the equation:

$$F_Q = \left[ 1/n \sum_{i=1}^{n} (Hi)^2 \right]^{\frac{1}{2}}$$

where
   n = number of scans;
   Hi = Y-coordinate of the signal at each X position for scan i; and
   $F_Q$ = flatness factor.

17. The apparatus of claim 11, wherein the determining means is further capable of determining a set of highest deviation values from a reference line.

18. The apparatus of claim 11, wherein the determining means calculates deviations of the detected reflected signals from a reference line for use in the root mean square function.

19. The apparatus of claim 11, wherein the determining means is further capable of calculating the flatness $F_Q$, the mean $F_A$ and/or the standard deviation $D_S$ of (a) film surface edge portions or zones, (b) one or more strips or lanes in the area between the edge portions or zones, and/or (c) one or more patch or specialized lane anywhere on the surface.

20. A method of measuring the flatness of a surface having a length and a width, the method comprising the steps of:

generating electrical signals representative of an area in a plane including reflections of a light beam directed at a constant angle of incidence onto a reference line segment parallel to the surface width and at least one line segment across the width of the surface; and determining the flatness of the surface along the one line segment from the electrical signals utilizing a root mean square function.

21. A method of measuring the flatness of a surface having a length and a width, the method comprising the steps of:

generating a substantially coherent beam of light;

directing the beam on the surface at a constant angle of incidence such that the beam is reflected from successive line segments extending across the surface width;

detecting the position of the reflected beam in a plane; and determining the flatness of an area of the surface from the detected positions utilizing a root mean square function.

22. A method of measuring the flatness of a surface of a film having a length and a width, the method comprising the steps of:

(a) placing the film on a support of a transport table, the support moveable in a Z direction;

(b) directing a laser beam onto a line segment across the width in a X direction of the surface of the film at a constant angle of incidence;

(c) reflecting the beam from the surface to a screen to present an image of the reflectance showing deviations in a Y direction from a reference line segment;

(d) sensing the image of reflectance on the screen;

(e) generating analog electrical signals representative of the reflectance image;

(f) digitizing and storing the digital signals; and (g) determining the flatness of the surface from the stored signals utilizing a root mean square function.

23. The method of claim 22, further comprising the steps of:

(h) moving the table a preselected incremental distance; and (i) repeating steps (b) through (f) for successive line segments before performing step (g).

24. The method of claim 22, wherein the determining step includes:

(j) determining the X and Y coordinates of a first one of the two ends of the line segment;

(k) determining the X and Y coordinates of a second one of the two ends of the line segment;

(l) starting at the first end of the line segment, choosing each X coordinate in the line segment and, for each X coordinate, determining the Y coordinate having the maximum intensity value; and (m) calculating the flatness of the line segment utilizing the X and Y coordinates determined by steps (j-l).

25. The method of claim 24, wherein the determining step (j) comprises:

choosing a X coordinate lower than the first X coordinate of the line segment;

checking the intensity value at each Y coordinate having the chosen X value to see if it is above a threshold value; and then increasing the X coordinate one at a time and for each X coordinate performing the checking step until a set of X and Y coordinates is found with an intensity value greater than the threshold value.

26. The method of claim 24, wherein the determining step (k) comprises:

choosing a X coordinate higher than the highest X coordinate of the line segment based upon a film width value inputted by an operator;

checking the intensity value at each Y coordinate having the chosen X value to see if it is above a threshold value; and then decreasing the X coordinate one at a time and for each X coordinate performing the checking step until a set of X and Y coordinates is found with an intensity value greater than the threshold value.

27. The method of claim 24, wherein the choosing step (l) comprises:

comparing the the intensity value for each Y coordinate having the chosen X coordinate with another one of the Y coordinates having the same X coordinate to determine which one has a higher intensity value; and then comparing the intensity value of the Y coordinate having the higher intensity value from the previous comparison with another one of the Y coordinates having the same X coordinate until the intensity value of the last Y coordinate having the same X coordinate is compared with the intensity value of the Y coordinate having the higher intensity value from the previous comparison.

28. The method of claim 27, wherein the choosing step (l) further comprises:

comparing each Y coordinate for each X coordinate to a threshold value; and flagging the X coordinates for which no Y coordinate exceeds the threshold value; and linearly interpolating between closest known Y coordinates to determine the Y coordinates of the flagged X coordinates.

* * * * *